US008602136B2

(12) United States Patent
Altena et al.

(10) Patent No.: US 8,602,136 B2

(45) Date of Patent: Dec. 10, 2013

(54) MOBILE FRAME FOR MOVING LESS ABLE-BODIED PERSONS

(75) Inventors: Willem Altena, Hengelo (NL); Jozef Huizinga, Wedde (NL)

(73) Assignees: Indes Holding B.V., Enschede (NL); Joyincare Group B.V., Wedde (NL)

( * ) Notice: Subject to any disclaimer, the term of this patent is extended or adjusted under 35 U.S.C. 154(b) by 257 days.

(21) Appl. No.: 12/937,478

(22) PCT Filed: Apr. 14, 2009

(86) PCT No.: PCT/NL2009/050195

§ 371 (c)(1), (2), (4) Date: Dec. 1, 2010

(87) PCT Pub. No.: WO2009/126038

PCT Pub. Date: Oct. 15, 2009

(65) Prior Publication Data

US 2011/0061952 A1 Mar. 17, 2011

(30) Foreign Application Priority Data

Apr. 11, 2008 (NL) ..................................... 2001476

(51) Int. Cl.
*B62D 51/04* (2006.01)

(52) U.S. Cl.
USPC ......... 180/19.3; 180/19.2; 180/19.1; 180/6.5; 180/6.2

(58) Field of Classification Search
USPC ................................. 180/19.3, 19.2, 6.5, 6.2
See application file for complete search history.

(56) References Cited

U.S. PATENT DOCUMENTS

| | | | | |
|---|---|---|---|---|
| 4,375,840 | A | 3/1983 | Campbell | |
| 5,758,371 | A | 6/1998 | VanDyke et al. | |
| 6,092,247 | A * | 7/2000 | Wilson | 5/86.1 |
| 6,178,575 | B1 * | 1/2001 | Harada | 5/600 |
| 6,276,475 | B1 * | 8/2001 | Nakanosono | 180/65.8 |
| 7,661,493 | B2 * | 2/2010 | Rose | 180/19.3 |
| 2003/0079923 | A1 * | 5/2003 | Johnson | 180/19.3 |
| 2009/0188731 | A1 * | 7/2009 | Zerhusen et al. | 180/19.3 |

FOREIGN PATENT DOCUMENTS

| | | | |
|---|---|---|---|
| GB | 2 042 436 | A | 9/1980 |
| WO | WO 2004/069125 | A1 | 8/2004 |
| WO | WO 2006/059200 | A2 | 6/2006 |

* cited by examiner

*Primary Examiner* — Tashiana Adams
*Assistant Examiner* — Marlon Arce
(74) *Attorney, Agent, or Firm* — Birch, Stewart, Kolasch & Birch, LLP

(57) ABSTRACT

A mobile frame, for instance for moving less able-bodied persons, comprising a castor with a wheel drive and pivot drive and operating means for operating the wheel drive and the pivot drive for moving the frame, wherein the operating means comprise a handle connected to the bearing structure, a force detection assembly provided on the handles and/or on the bearing frame, and which is configured for producing signals which contain information about both the size of force and the direction of force exerted on the handle, a control which is configured for energizing the pivot drive for controlling the rotational position of drive wheel support about the pivot depending on the direction of force, and wherein the control is configured for energizing the wheel drive depending on the size of force exerted on the handle.

33 Claims, 5 Drawing Sheets

MOBILE FRAME FOR MOVING LESS ABLE-BODIED PERSONS

FIELD

The invention relates to a mobile frame for moving less able-bodied persons, in particular to be used in a hoist, a bed, a wheelchair.

BACKGROUND

A hoist provided with a pivotal drive wheel is known from WO2004/069125 and U.S. Pat. No. 5,758,371. A hospital bed with a pivotal drive wheel is known from WO2006059200A2, wherein different possibilities are disclosed for effecting pivoting of the drive wheel.

The operation of the pivotal drive wheels takes place with the aid of a generally known joystick. Such a control requires practice of the user in the sense that the user has to accustom himself to the manner in which the mobile frame reacts to a specific movement of the joystick.

SUMMARY

The invention has for an object to provide a mobile frame which is provided with a drive, whose driving direction is controllable and which has an intuitive control.

To that end, the invention provides a mobile frame, for instance for moving less able-bodied persons, comprising:

- at least one base structure;
- at least one drive wheel which is rotatable about a wheel central axis;
- at least one wheel drive configured for driving the drive wheel about the wheel central axis;
- at least one drive wheel support which is connected to the bearing structure in a manner pivotable about a pivot and with which the drive wheel is connected for rotation about the wheel central axis;
- a pivot drive configured for pivoting the wheel support about the pivot with respect to the bearing structure; and
- operating means for operating the wheel drive and for operating the pivot drive for moving the base frame, the operating means comprising:
  - a handle connected to the bearing structure;
  - a force detection assembly provided on the handle and/or on the bearing structure, and configured for producing signals containing information about both the size of the force and the direction of force which is exerted on the handle;
  - a control, of which an input is connected to the force detection assembly, and of which a first output is connected to the at least one wheel drive and of which a second output is connected to the at least one pivot drive, the control being configured for energizing the pivot drive for controlling the rotational position of drive wheel support about the pivot depending on the direction of force, while the control is configured for energizing the wheel drive depending on the size of force exerted on the handle.

Such a mobile frame provides an intuitive control. Here, in one embodiment, the handle is non-movably connected to the bearing structure. Therefore, the care worker or user of the mobile frame pushes the non-movable operating handle in the desired direction of movement. The non-movable and hence direct coupling between the operating handle and frame provides a secure sensation the user is acquainted to from non-driven mobile frames for hoists, beds and the like. However, by the force detection assembly, the force a user exerts on the handle is detected and the drive wheel is pivoted by the control in a desired direction and the drive wheel motor is driven at a speed which is related to a force exerted on the handle. It is self-evident that this needs not be a linear relation. However, in one embodiment, such a linear relation is indeed a possibility. Through the use of the force detection means, the drive means can already be activated by exerting a minimal force on the operating means, which is further beneficial to the ease of use of the frame according to the invention.

In one embodiment, the force detection assembly can be configured for measuring an elastic deformation of the operating handle and/or the bearing frame which occurs under the influence of a force exerted by a user on the handle and for converting this measured deformation into signals which contain information about the size of the force as well as the direction of the force of the force exerted on the handle. The handle may be manufactured from metal and the deformations which are measured as a result of exertion of force can therefore be particularly small, such that the user does not notice the handle slightly deforming.

In one embodiment, the force detection assembly can comprise at least one strain gauge assembly. Such a strain gauge assembly can for instance comprise a strain gauge for measuring deformation as a result of a force in lateral direction and a strain gauge for measuring deformation as a result of a force in longitudinal direction of the frame. The signals of the two strain gauges together can thus contain information about size of force and direction of force. With such a strain gauge assembly, a simple and hence effective control of the frame can be realized.

In an alternative embodiment, the force detection assembly can comprise at least one load cell assembly. Such load cell assemblies are commercially available at low cost price and are themselves often provided with strain gauge assemblies.

In one embodiment, the control unit can be configured for generating a control signal for the pivot drive which is such that the drive wheel is positioned in an initial condition relative to the bearing structure when no force is exerted on the handle. Thus, after operation of the frame, the drive wheel will automatically return to the initial condition in order to reach each successive condition as rapidly as possible during a subsequent operation of the frame. In the initial condition, the drive wheel can extend for instance in a plane which is parallel to a longitudinal axis of the frame.

The pivotal angle for pivoting the wheel support with respect to the bearing structure can be bounded by at least one bounding element. It can thus be prevented that the wheel support is oriented back-to-front with respect to the bearing structure, which could negatively influence the propelling movement and hence the ease of use of the frame.

In one embodiment, the pivot is oriented substantially vertically. Such vertical orientation enables simple pivoting. The pivot can be staggered in horizontal direction with respect to the wheel axle. However, it is also possible that the pivot central axis intersects the wheel axle central axis. Here, it is preferred that the wheel central axis is oriented substantially horizontally.

The wheel drive and the pivot drive can be of different nature, but will generally each comprise an electric motor, so that both movements can be made independently of each other in a relatively simple manner. In an advantageous embodiment, the wheel drive is designed as a hub motor which is provided substantially in a hub of the drive wheel. By means of a hub motor, the drive of the drive wheel can be concealed in the drive wheel relatively compactly and efficiently. A particularly advantageous hub motor is formed by a so-called direct drive electric motor, with the aid of which the hub is driven directly by the (electric) motor, without the interposition of other mechanic components, which has as an advantage that the direct drive electric motor will cause hardly any friction, if at all, in case this electric motor is not active.

Although the use of only one single drive wheel suspended in a single wheel support will, as a rule, already function in a particularly satisfying manner, it is also conceivable that the frame comprises several drive wheels. Here, the several drive wheels can be suspended in a common wheel support or in different wheel supports.

It may then be advantageous when the several drive wheels are mutually mechanically coupled, in order to guarantee a controlled and relatively simple control of the frame. Apart from the use of at least one separately driven propelling wheel and at least one separately driven steering wheel, also, various variant embodiments are conceivable.

In addition to drive wheels, it is also conceivable that the frame comprises one or more supporting wheels connected to the bearing structure. As a rule, here, the passive supporting wheels are connected in a freely pivotal manner, through the interposition of a wheel support, to the bearing structure and can provide the frame with a desired stability.

In one embodiment, the operating means can be designed as an operating means assembly connected to the frame as a detachable unit. This offers the advantage that a larger number of frames can be purchased than the relatively expensive operating means. This may be of advantage from a point of view of costs.

In a further elaboration, the operating means assembly can also comprise an accumulator. When the operating means assembly is uncoupled from the frame the operating means can be charged at a central location while the piece of furniture or the hoist can be disposed at a location suitable to the user.

The invention also relates to a mobile piece of furniture for moving persons, which piece of furniture comprises a mobile frame according to the invention. Here, the mobile piece of furniture can take the form of a chair or bed.

The invention further relates to hoist for moving persons, which were used comprises a frame according to the invention. Here, the frame can be detachably connected to the hoist. The hoist then further be of diverse nature and is preferably provided with a lifting arm connected to the frame, which lifting arm is provided with optionally clamping engaging means for engaging the person to be moved. By then moving the lifting arm relative to the bearing structure, the person can be moved from a first condition (lying, sitting or standing) to a second condition (lying, sitting or standing). During driving of the mobile hoist, the position of the person will usually not be changed.

The invention also provides a method for moving a person comprising:

- providing a mobile piece of furniture according to claim 15 or providing a hoist according to claim 16;
- having the person to be moved sit down on the piece of furniture or in the hoist; and
- exerting a force on the handle for moving the piece of furniture or the hoist at a desired speed and in a desired direction.

As a rule, it is advantageous when a force is exerted on the operating means, this force is detected and is converted by a control unit into a control signal for controlling the driving means. By electronically (digitally) driving the driving means, only a minimal effort is required from a person for moving the frame at wish. In a special preferred embodiment, a size of force exerted on the operating means is converted into a control signal for rotating the at least one drive wheel about the wheel central axis with respect to the at least one wheel support and/or a direction of force exerted on the operating means is converted into a control signal for rotating the at least one wheel support with respect to the bearing structure. Such use of the exerted force is beneficial to the steering sensitivity and hence the user friendliness of the frame.

DETAILED DESCRIPTION

Figure 1:
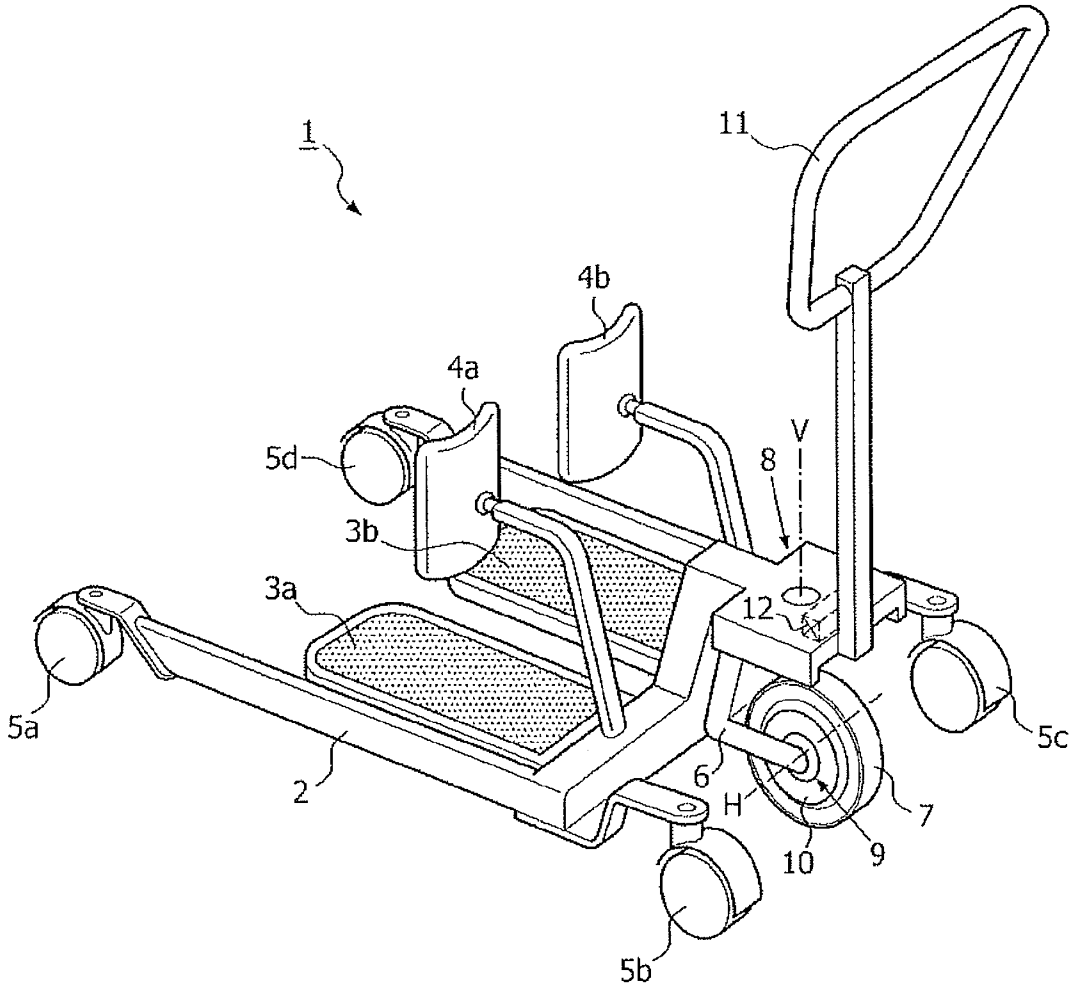
FIG. 1 shows a perspective view to a mobile frame according to the invention.

FIG. 1 shows a perspective view to a mobile frame 1 according to the invention. The mobile frame 1 is designed for transporting less able-bodied persons and comprises a bearing structure 2 for a person to be transported, wherein the bearing structure 2 can be provided with two foot supports 3*a*, 3*b*, and two knee supports 4*a*, 4*b* on which or against which, respectively, the person can bear. The frame 1 also comprises four stabilizing castors 5*a*-5*d* connected to the bearing structure 2. In addition, the frame 1 comprises a wheel support 6 connected to the bearing structure 2 in a manner pivotable about a vertical axis of rotation V, in which wheel support is provided a drive wheel 7, rotatable about a horizontal axis of rotation H. The frame 1 comprises a pivot drive which, in the exemplary embodiment, is designed as an electric motor 8 for motorized rotation of the assembly of the wheel support 6 and the drive wheel 7 suspended therein with respect to the vertical axis of rotation V for steering the frame 1 sideways. In addition, the frame 1 comprises a wheel drive 9 which is designed in the exemplary embodiment as an electric motor, more particularly as hub motor, in particular a direct drive motor which is provided in a hub 10 of the drive wheel 7. The wheel drive 9 is designed for rotating the drive wheel 7 in forward or rearward direction and hence for propelling the frame 1. By means of an operating handle 11, both drives 8, 9 can be selectively driven. Here, the operating handle 11 is coupled to the bearing structure 2. The coupling is non-movable. The operating handle 11 is provided with one or more strain gauges (not represented) for detection of a size of force and direction of force exerted on to the operating handle 11. By means of a control unit 12, the forces exerted on the operating handle 11, detected by means of the straining gauges can be converted into one or several control signals for the purpose of controlling the pivot drive 8 and/or the wheel drive 9.

Figure 2A:
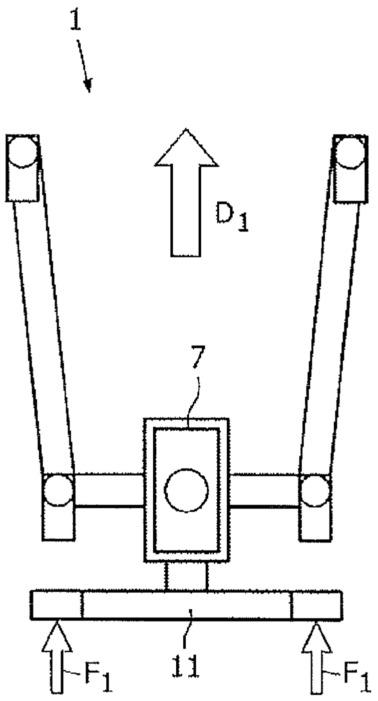
FIGS. 2*a*-2*d* show different schematic views to the control of the frame according to FIG. 1.
Figure 2B:
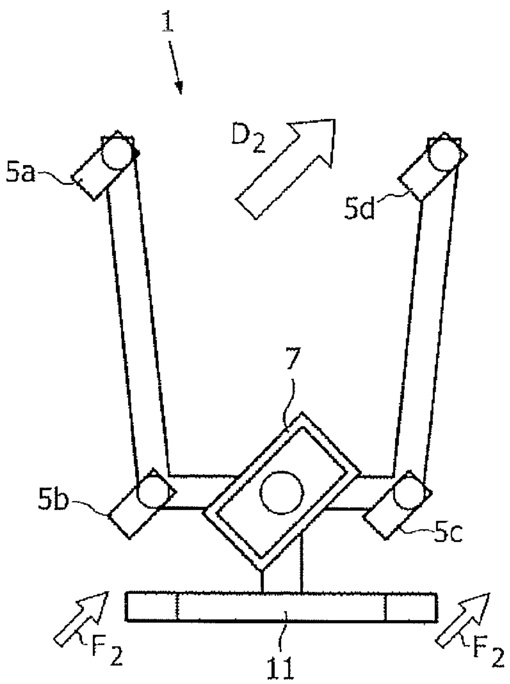
Figure 2C:
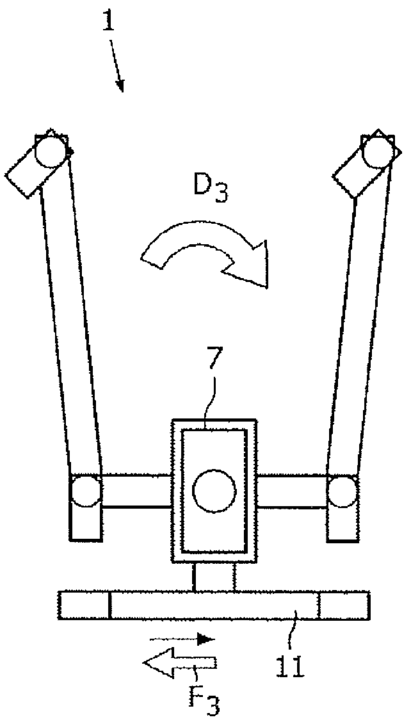
Figure 2D:
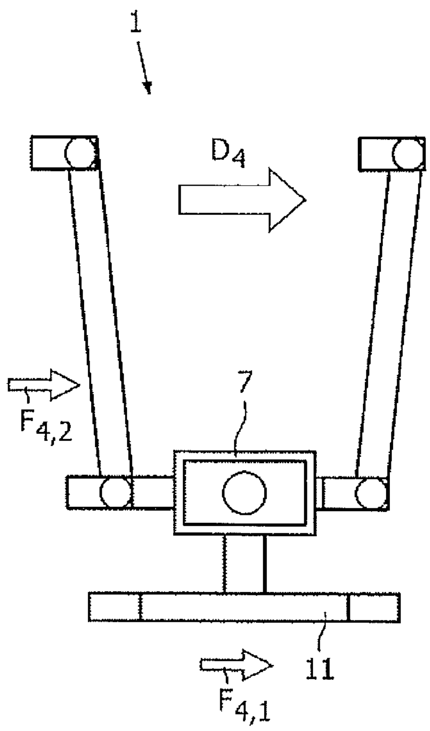

The schematic operation of the mobile frame 1 shown in FIG. 1 is shown in FIGS. 2*a*-2*d*. In FIG. 2*a* it is shown that in case a frontal force $F_1$ is exerted on the operating handle 11, the drive wheel 7 is in line with the bearing structure 2, and the frame 1 will move in forward direction $D_1$. In case also a lateral force $F_2$ is exerted on the operating handle 11, the drive wheel 7 will rotate (under the influence of the wheel support 6) with respect to the bearing structure 2, as a result of which the frame 1 will be moved in a forward direction towards the right $D_2$ (FIG. 2*b*). As shown, the castors 5*a*-5*d* will follow the orientation of the drive wheel 7 with respect to the bearing structure 2. In case only a torsional force $F_3$ is exerted on the operating handle 11, in one embodiment, the drive wheel 7 cannot react, so that the frame 1 can be manually rotated in a direction $D_3$ (FIG. 2*c*). In case both a lateral force $F_{4,1}$ is exerted on the operating handle 11 and a lateral force $F_{4,2}$ is exerted in the same direction on the bearing structure 2, the frame 1 will be moved under the influence of the drive wheel 7 as such in the same direction $D_4$ (FIG. 2*d*).

Figure 3:
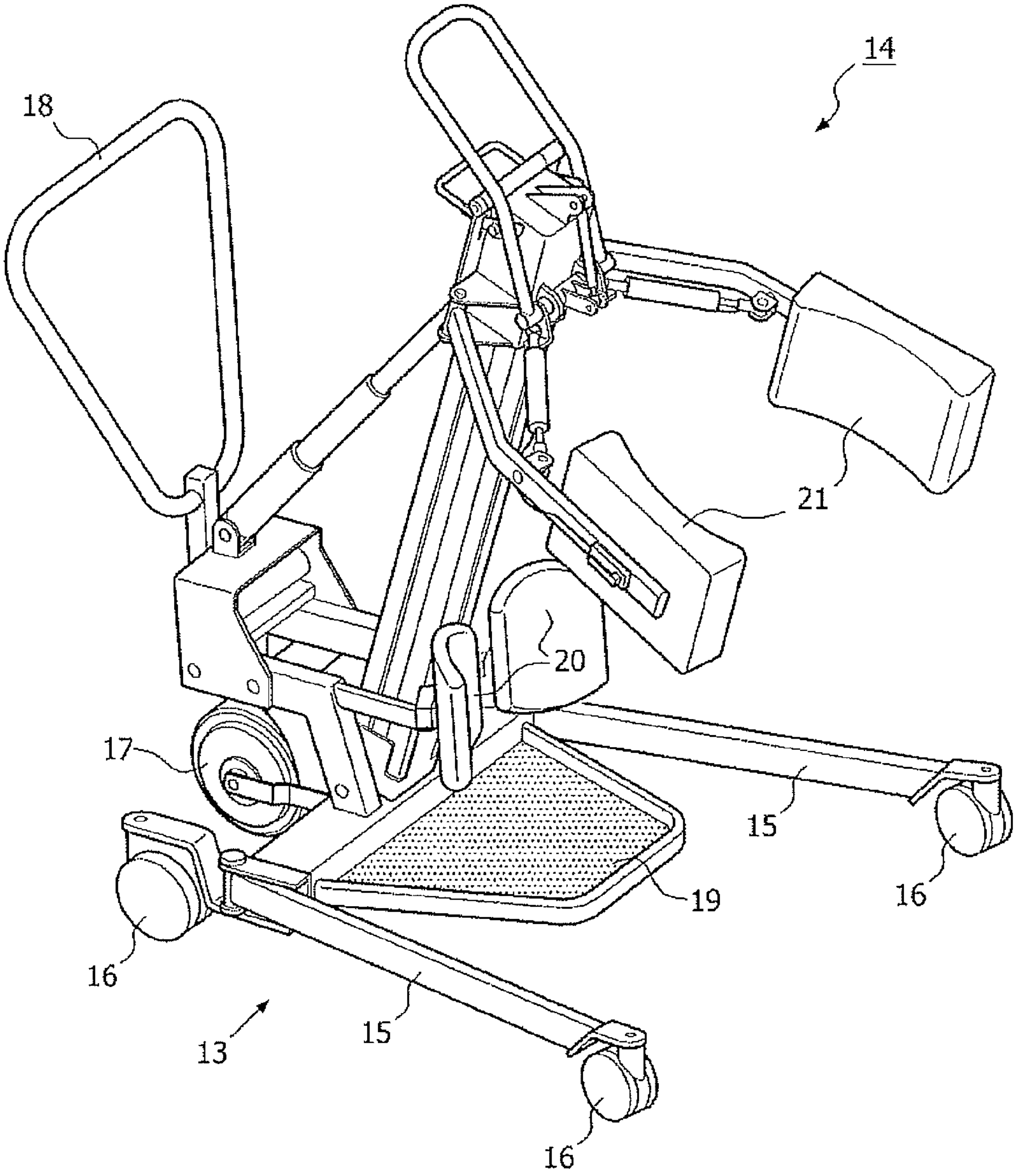
FIG. 3 shows a hoist comprising a mobile frame according to the invention.

FIG. 3 shows a mobile frame 13 according to the invention comprising a hoist 14 for moving less able-bodied persons. The hoist 14 further comprises a bearing structure 15 provided with several supporting wheels 16 and one drive wheel 17, which drive wheel 17 can be driven by means of an operating handle 18 for motorized movement of the frame 13 and hence of the hoist 14. With regard to construction and operation, the frame 13 resembles the frame 1 shown in FIGS. 1-2*d*. The bearing structure also comprises a foot platform 19 and knee supports 20 on which or against which, respectively, a person to be moved can bear. The hoist 14 further comprises an articulated lifting column 20 pivotally connected to the bearing structure 15, to which column a clamping device 21 is connected for clamping the person to be moved. With the aid of the telescopic hoisting column 20, a clamped person can be moved following a natural path from a seated position to a standing position and vice versa.

Figure 4:
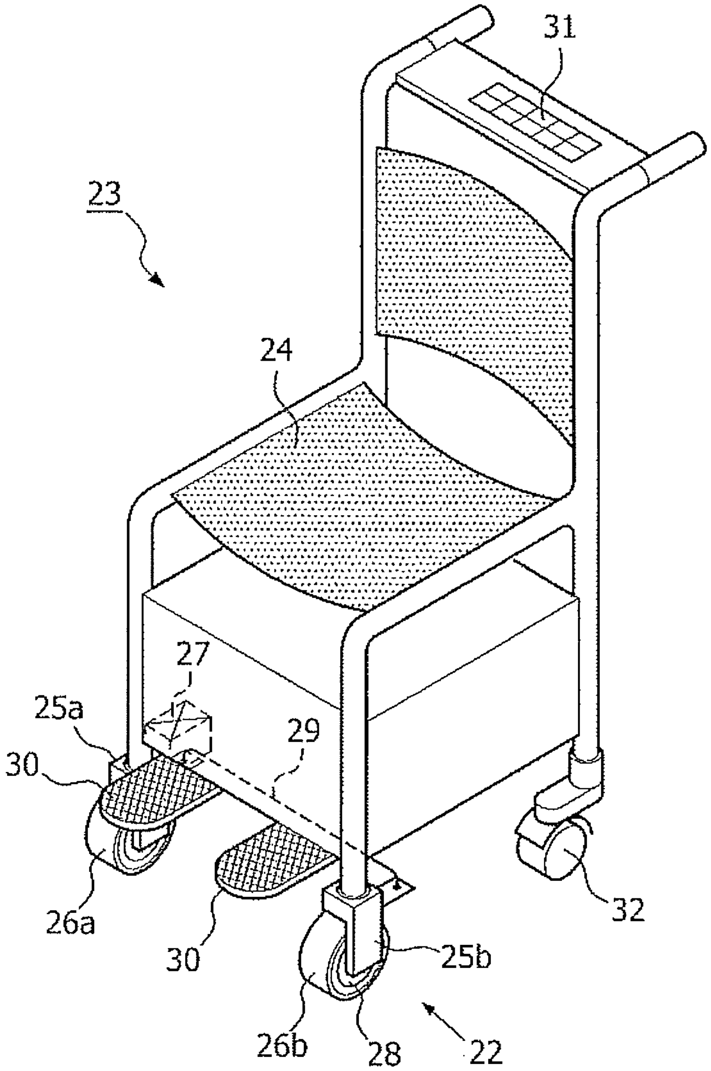
FIG. 4 shows a mobile chair comprising a mobile frame according to the invention.

FIG. 4 shows a mobile frame 22 according to the invention comprising a mobile chair 23 for efficiently moving less able-bodied persons. Here, the chair 23 comprises a seat 24 to which two front wheel supports 25*a*, 25*b* are pivotally connected, while each wheel support 25*a*, 25*b* is provided with a wheel 26*a*, 26*b*. One of the wheel supports 25*a* is coupled to a first pivoting motor 27 for motorized pivoting of the wheel support 25*a*, and thus of the wheel 26*a* suspended therein. In the other front wheel support 25*b* a drive wheel 26*b* is suspended, which drive wheel 26*d* is provided with a hub motor 28 for propelling the chair 23. The two front wheel supports 25*a*, 25*b* are coupled by means of a pivotal rod mechanism 29 for guaranteeing a controlled moving of the chair 23. In order to enhance the comfort for the person to be moved, the chair 23 is provided with two foot supports. The two motors can be controlled by a control which receives as input signals the signals from a force detection assembly. The force detection assembly can for instance be built-in in the two rods connected to the handles which, together, can also be considered to be a handle. Optionally, the two motors 27, 28 can also be selectively operated by means of a touch screen 31 connected to the seat 24. The chair 24 further comprises two passive (rear) castors 32 connected to the seat 24 in a freely rotatable manner.

Figure 5:
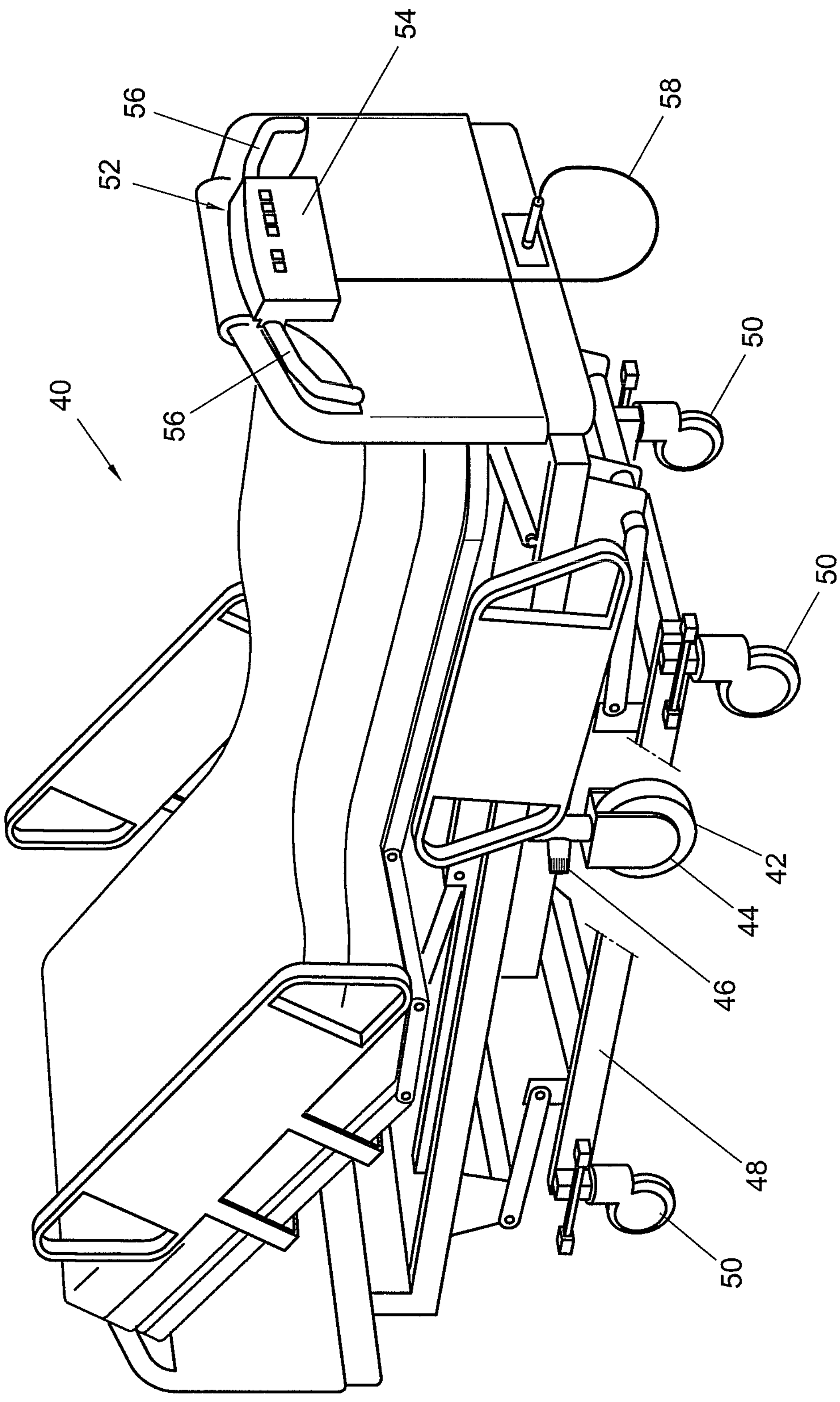
FIG. 5 shows a hospital bed with an exemplary embodiment of the mobile frame.

FIG. 5 shows an exemplary embodiment of a hospital bed 40 which is provided with a mobile frame with a central, pivotal drive wheel 42 with a wheel drive in the form of a hub motor 44 and provided with a pivot drive 46 for pivoting the castor 42. At the corners of the bearing structure 48 of the frame, pivotal supporting wheels 50 are mounted. At the foot of the bed, an operating means assembly 52 connected to the bed is arranged. The operating means assembly 52 may comprise a housing 54 in which an accumulator and the control are included. The housing 54 can be connected to a non-movable handle 56. On this handle 56 or the housing 54 connected therewith, the force detection assembly can be mounted. The operating means assembly 52 can be connected by means of a cable 58 to the hub motor 44 and the pivot drive 46. Optionally, on the operating means assembly 52, operating buttons can be present for operating functions of the operating means assembly 52. An advantage of such a detachable operating means assembly is that a hospital needs not purchase such a relatively expensive assembly for each bed. Another advantage is that the accumulator can be charged at a central location.

It will be clear that the invention is not limited to the exemplary embodiments represented here, but that within the framework of the accompanying clams, numerous variants are possible which will be self evident for the person skilled in this field of technology. A frame according to the invention can for instance also be used for moving other heavy loads, such as, for instance, a mobile X-ray machine or the like where intuitive control is an advantage.

The invention claimed is:

1. A mobile frame for moving less able-bodied persons, comprising:

at least one base bearing structure;

at least one drive wheel which is rotatable about a wheel central axis;

at least one wheel drive configured for driving the drive wheel about the wheel central axis;

at least one drive wheel support which is connected to the bearing structure in a manner pivotable about a pivot and with which the drive wheel is connected for rotation about the wheel central axis;

a pivot drive configured for pivoting the wheel support about the pivot with respect to the bearing structure; and an operating device configured to operate the wheel drive and the pivot drive for moving the frame, the operating device comprising:

a handle unmovably connected to the bearing structure;

a force detection assembly provided on the handle and/or on the bearing structure, and configured for measuring an elastic deformation of the operating handle and/or the bearing frame, which occurs under the influence of a force exerted by a user on the handle and for converting this measured deformation into signals containing information about both the size of the force and the direction of force which is exerted on the handle; and a control, of which an input is connected to the force detection assembly, and of which a first output is connected to the at least one wheel drive and of which a second output is connected to the at least one pivot drive, the control being configured for energizing the pivot drive for controlling the rotational position of drive wheel support about the pivot depending on the direction of force, and wherein the control is configured for energizing the wheel drive depending on the size of force exerted on the handle.

2. The frame according to claim 1, wherein the force detection assembly comprises at least one strain gauge assembly.

3. The frame according to claim 1, wherein the force detection assembly comprises at least one load cell.

4. The frame according to claim 1, wherein the control unit is configured for generating a control signal for the pivot drive which is such that the drive wheel is positioned in an initial condition with respect to the bearing structure when no force is exerted on the handle.

5. The frame according to claim 1, wherein the pivotal angle for pivoting the wheel support with respect to the bearing structure is bounded by at least one bounding element.

6. The frame according to claim 1, wherein the pivot is oriented substantially vertically.

7. The frame according to claim 1, wherein the wheel drive comprises at least one hub motor which is provided substantially in a hub of the drive wheel.

8. The frame according to claim 1, wherein the frame comprises several wheel supports connected to the bearing structure in a manner pivotable about a pivot, and comprises several drive wheels connected to the respective wheel supports in a manner rotatable about a wheel central axis.

9. The frame according to claim 8, wherein the several drive wheels are mutually mechanically coupled.

10. The frame according to claim 1, wherein the frame also comprises at least one support wheel connected to the bearing structure.

11. The frame according to claim 1, wherein the operating device is designed as an operating device assembly which is connected to the frame as a detachable unit.

12. The A frame according to claim 11, wherein the operating device assembly also comprises an accumulator.

13. A mobile piece of furniture for moving persons, which piece of furniture comprises a mobile frame according to claim 1.

14. A hoist for moving persons, which hoist comprises a mobile frame according to claim 1.

15. A method for moving a person, comprising the steps of:
- providing a mobile piece of furniture or providing a hoist, the mobile piece of furniture or the hoist including a mobile frame according to claim 1;
- having the person to be moved sit down on the piece of furniture or in the hoist; and
- exerting a force on the handle for moving the piece of furniture or the hoist with a desired speed and direction.

16. A mobile frame for moving less able-bodied persons, comprising:
- at least one base bearing structure;
- at least one drive wheel which is rotatable about a wheel central axis;
- at least one wheel drive configured for driving the drive wheel about the wheel central axis;
- at least one drive wheel support which is connected to the bearing structure in a manner pivotable about a pivot and with which the drive wheel is connected for rotation about the wheel central axis;
- a pivot drive configured for pivoting the wheel support about the pivot with respect to the bearing structure; and
- an operating device configured to operate the wheel drive and the pivot drive for moving the frame, the operating device comprising:
  - a handle connected to the bearing structure;
  - a force detection assembly provided on the handle and/or on the bearing structure, and configured for producing signals containing information about both the size of the force and the direction of force which is exerted on the handle; and
- a control, of which an input is connected to the force detection assembly, and of which a first output is connected to the at least one wheel drive and of which a second output is connected to the at least one pivot drive, the control being configured for energizing the pivot drive for controlling the rotational position of drive wheel support about the pivot depending on the direction of force, and wherein the control is configured for energizing the wheel drive depending on the size of force exerted on the handle,
- wherein the control unit is configured for generating a control signal for the pivot drive which is such that the drive wheel is positioned in an initial condition with respect to the bearing structure when no force is exerted on the handle.

17. The frame according to claim 16, wherein the pivotal angle for pivoting the wheel support with respect to the bearing structure is bounded by at least one bounding element.

18. The frame according to claim 16, wherein the pivot is oriented substantially vertically.

19. The frame according to claim 16, wherein the frame also comprises at least one support wheel connected to the bearing structure.

20. A mobile piece of furniture for moving persons, which piece of furniture comprises a mobile frame according to claim 16.

21. A hoist for moving persons, which hoist comprises a mobile frame according to claim 16.

22. A method for moving a person, comprising the steps of:
- providing a mobile piece of furniture or providing a hoist, the mobile piece of furniture or the hoist including a mobile frame according to claim 16;
- having the person to be moved sit down on the piece of furniture or in the hoist; and
- exerting a force on the handle for moving the piece of furniture or the hoist with a desired speed and direction.

23. A mobile frame for moving less able-bodied persons, comprising:
- at least one base bearing structure;
- at least one drive wheel which is rotatable about a wheel central axis;
- at least one wheel drive configured for driving the drive wheel about the wheel central axis;
- at least one drive wheel support which is connected to the bearing structure in a manner pivotable about a pivot and with which the drive wheel is connected for rotation about the wheel central axis;
- a pivot drive configured for pivoting the wheel support about the pivot with respect to the bearing structure; and
- an operating device configured to operate the wheel drive and the pivot drive for moving the frame, the operating device comprising:
  - a handle connected to the bearing structure;
  - a force detection assembly provided on the handle and/or on the bearing structure, and configured for producing signals containing information about both the size of the force and the direction of force which is exerted on the handle; and
- a control, of which an input is connected to the force detection assembly, and of which a first output is connected to the at least one wheel drive and of which a second output is connected to the at least one pivot drive, the control being configured for energizing the pivot drive for controlling the rotational position of drive wheel support about the pivot depending on the direction of force, and wherein the control is configured for energizing the wheel drive depending on the size of force exerted on the handle,
- wherein the frame comprises several wheel supports connected to the bearing structure in a manner pivotable about a pivot, and comprises several drive wheels connected to the respective wheel supports in a manner rotatable about a wheel central axis.

24. The frame according to claim 23, wherein the several drive wheels are mutually mechanically coupled.

25. The frame according to claim 23, wherein the frame also comprises at least one support wheel connected to the bearing structure.

26. A mobile piece of furniture for moving persons, which piece of furniture comprises a mobile frame according to claim 23.

27. A hoist for moving persons, which hoist comprises a mobile frame according to claim 23.

28. A method for moving a person, comprising the steps of:

providing a mobile piece of furniture or providing a hoist, the mobile piece of furniture or the hoist including a mobile frame according to claim 23;

having the person to be moved sit down on the piece of furniture or in the hoist; and exerting a force on the handle for moving the piece of furniture or the hoist with a desired speed and direction.

29. A mobile frame for moving less able-bodied persons, comprising:

at least one base bearing structure;

at least one drive wheel which is rotatable about a wheel central axis;

at least one wheel drive configured for driving the drive wheel about the wheel central axis;

at least one drive wheel support which is connected to the bearing structure in a manner pivotable about a pivot and with which the drive wheel is connected for rotation about the wheel central axis;

a pivot drive configured for pivoting the wheel support about the pivot with respect to the bearing structure; and an operating device configured to operate the wheel drive and the pivot drive for moving the frame, the operating device comprising:

a handle connected to the bearing structure;

a force detection assembly provided on the handle and/or on the bearing structure, and configured for producing signals containing information about both the size of the force and the direction of force which is exerted on the handle; and a control, of which an input is connected to the force detection assembly, and of which a first output is connected to the at least one wheel drive and of which a second output is connected to the at least one pivot drive, the control being configured for energizing the pivot drive for controlling the rotational position of drive wheel support about the pivot depending on the direction of force, and wherein the control is configured for energizing the wheel drive depending on the size of force exerted on the handle, wherein the operating device is designed as an operating device assembly which is connected to the frame as a detachable unit.

30. The frame according to claim 29, wherein the operating device assembly also comprises an accumulator.

31. A mobile piece of furniture for moving persons, which piece of furniture comprises a mobile frame according to claim 29.

32. A hoist for moving persons, which hoist comprises a mobile frame according to claim 29.

33. A method for moving a person, comprising the steps of:

providing a mobile piece of furniture or providing a hoist, the mobile piece of furniture or the hoist including a mobile frame according to claim 29;

having the person to be moved sit down on the piece of furniture or in the hoist; and exerting a force on the handle for moving the piece of furniture or the hoist with a desired speed and direction.

* * * * *

UNITED STATES PATENT AND TRADEMARK OFFICE

CERTIFICATE OF CORRECTION

PATENT NO. : 8,602,136 B2
APPLICATION NO. : 12/937478
DATED : December 10, 2013
INVENTOR(S) : Altena et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this
Twenty-second Day of September, 2015

Michelle K. Lee
*Director of the United States Patent and Trademark Office*